(12) United States Patent
Kopelman et al.

(10) Patent No.: US 12,310,813 B2
(45) Date of Patent: May 27, 2025

(54) ORTHODONTIC ATTACHMENT DEVICES

(71) Applicant: Align Technology, Inc., San Jose, CA (US)

(72) Inventors: Avi Kopelman, Palo Alto, CA (US); Chunhua Li, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/712,846

(22) Filed: Dec. 12, 2019

(65) Prior Publication Data

US 2020/0188062 A1    Jun. 18, 2020

Related U.S. Application Data

(60) Provisional application No. 62/778,827, filed on Dec. 12, 2018.

(51) Int. Cl.
*A61C 7/16* (2006.01)
*A61C 7/08* (2006.01)

(52) U.S. Cl.
CPC . *A61C 7/16* (2013.01); *A61C 7/08* (2013.01)

(58) Field of Classification Search
CPC .................................. A61C 7/16; A61C 7/08
See application file for complete search history.

(56) References Cited

U.S. PATENT DOCUMENTS

| | | | | |
|---|---|---|---|---|
| 5,964,587 A * | 10/1999 | Sato | ........................ | A61C 7/00 433/6 |
| 5,975,893 A | 11/1999 | Chishti et al. | | |
| 6,053,729 A * | 4/2000 | Brehm | ..................... | A61C 7/14 433/17 |
| 6,309,215 B1 * | 10/2001 | Phan | ....................... | A61C 9/00 433/24 |
| 6,450,807 B1 | 9/2002 | Chishti et al. | | |
| 7,059,850 B1 * | 6/2006 | Phan | ....................... | A61C 7/08 433/24 |

(Continued)

FOREIGN PATENT DOCUMENTS

| | | | |
|---|---|---|---|
| CN | 105496573 A | 4/2016 | |
| GB | 2519139 A * | 4/2015 | ............. A61C 7/143 |

(Continued)

*Primary Examiner* — Cris L. Rodriguez
*Assistant Examiner* — Courtney N Huynh
(74) *Attorney, Agent, or Firm* — Shay Glenn LLP

(57) ABSTRACT

Orthodontic attachment devices for interacting with an orthodontic appliance. An anchoring attachment body may include first and second anchoring attachment regions connected by a connection region. The first and second anchoring attachment regions may be oriented differently such that their respective orthodontic appliance engagement surfaces are oriented in different directions. The connection region may include a first coupling end coupled to the first anchoring attachment region that is narrower than the first anchoring attachment region along a plane that is parallel to a bonding surface of the first anchoring attachment region. The connection region may have dimensions that define the positions of the first and second anchoring attachment regions and define orientations of the orthodontic appliance engagement surfaces so as to maintain set positions and orientations of the first and second anchoring attachment regions.

25 Claims, 5 Drawing Sheets

(56) References Cited

U.S. PATENT DOCUMENTS

| | | | |
|---|---|---|---|
| 8,562,337 B2* | 10/2013 | Kuo | A61C 7/08 433/6 |
| 8,708,697 B2* | 4/2014 | Li | A61C 7/14 433/18 |
| 9,119,691 B2* | 9/2015 | Namiranian | A61C 7/10 |
| 2003/0198911 A1* | 10/2003 | Knopp | B33Y 10/00 433/24 |
| 2007/0231767 A1* | 10/2007 | Sears | A61C 7/14 433/8 |
| 2009/0291406 A1* | 11/2009 | Namiranian | A61C 7/10 433/18 |
| 2015/0289950 A1* | 10/2015 | Khan | A61C 7/002 433/6 |
| 2016/0051341 A1* | 2/2016 | Webber | A61C 7/12 703/1 |
| 2016/0193014 A1* | 7/2016 | Morton | A61C 7/06 433/24 |
| 2016/0256240 A1 | 9/2016 | Shivapuja et al. | |
| 2017/0007360 A1 | 1/2017 | Kopelman et al. | |
| 2017/0231722 A1 | 8/2017 | Boronkay et al. | |
| 2017/0319296 A1 | 11/2017 | Webber et al. | |
| 2018/0221111 A1 | 8/2018 | Khouri | |

FOREIGN PATENT DOCUMENTS

| | | | | |
|---|---|---|---|---|
| WO | WO-2008030240 A1 * | 3/2008 | | A61C 7/14 |
| WO | WO2008/115654 A1 | 9/2008 | | |
| WO | WO-2015131015 A1 * | 9/2015 | | A61C 7/12 |
| WO | WO2017/062634 A1 | 4/2017 | | |

* cited by examiner

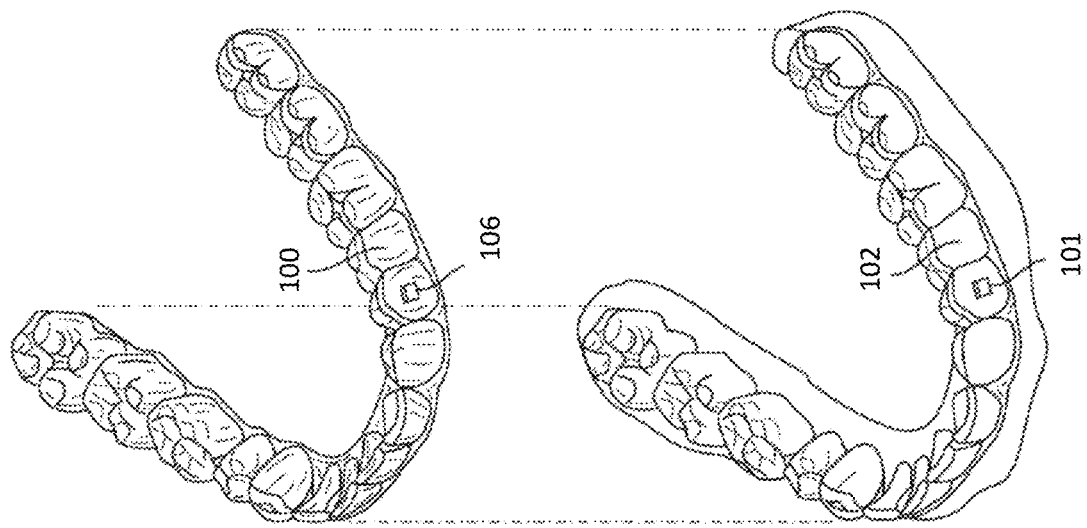
FIG. 1D
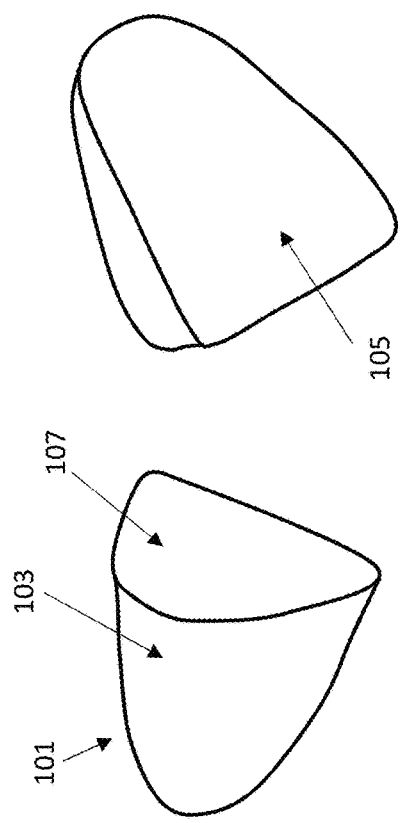
FIG. 1B
FIG. 1A
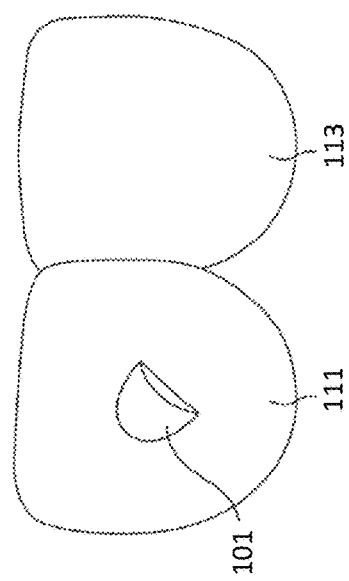
FIG. 1C

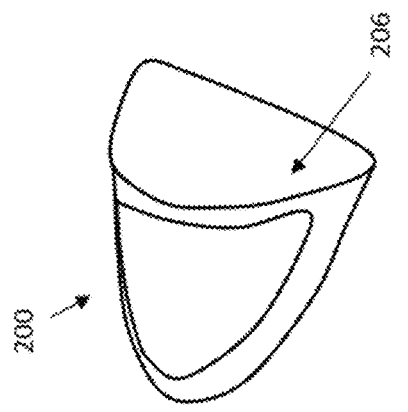
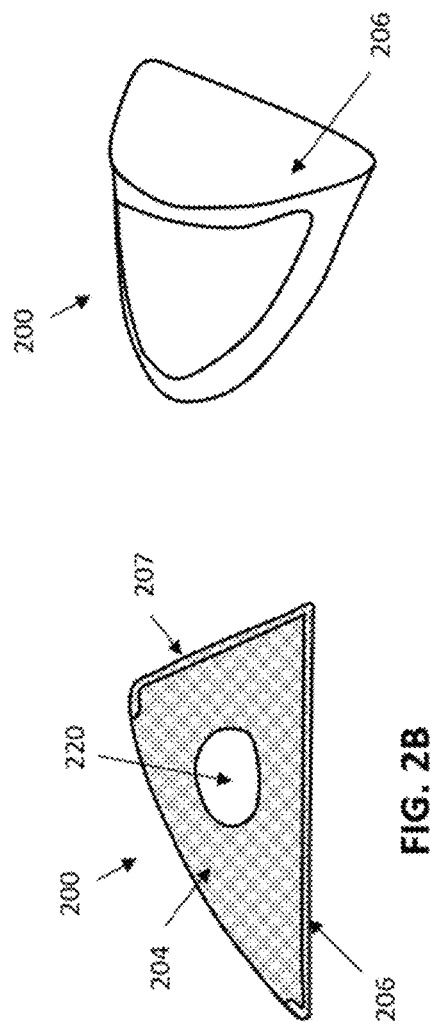
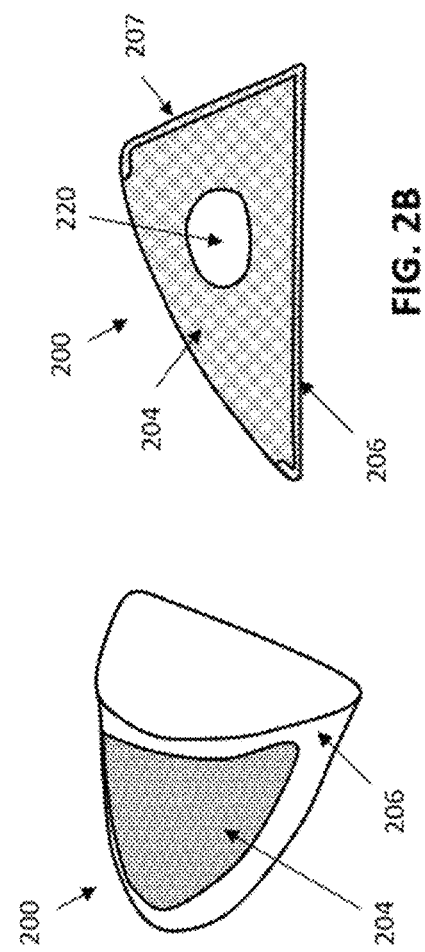
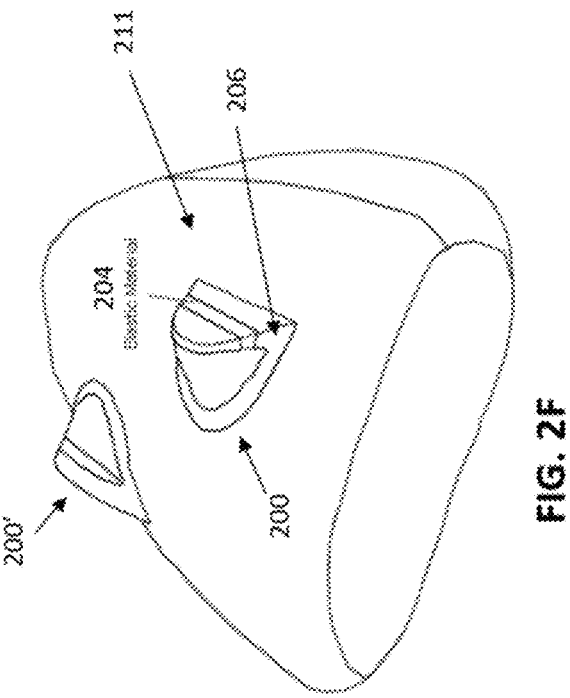
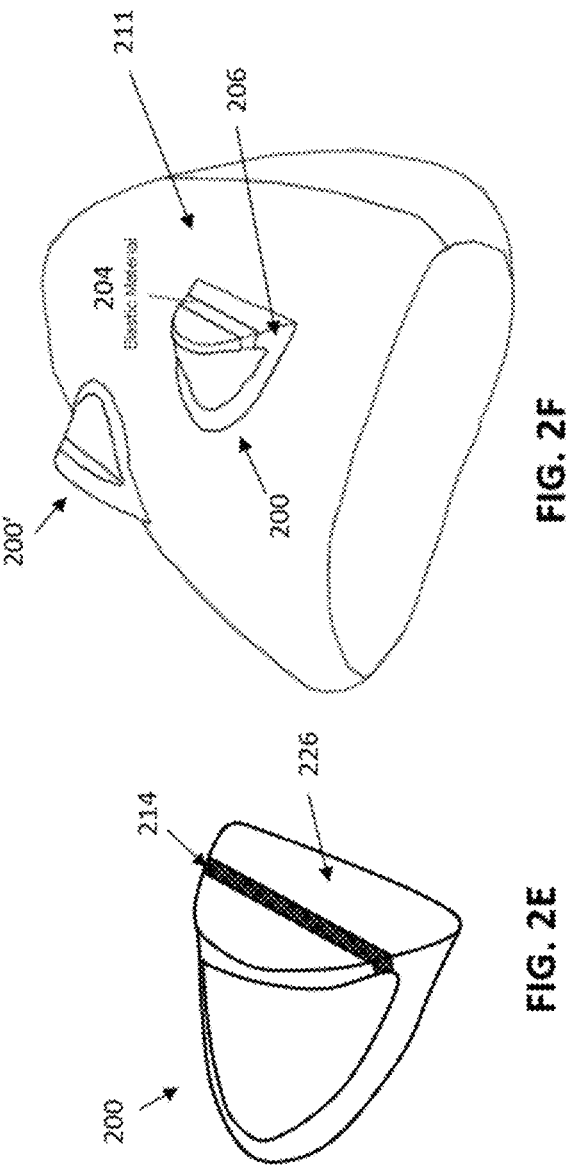
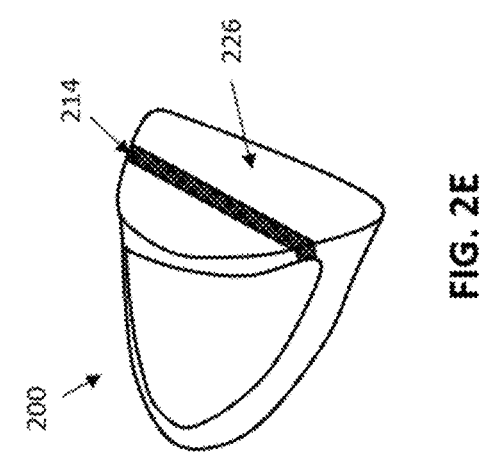

ORTHODONTIC ATTACHMENT DEVICES

CROSS REFERENCE TO RELATED APPLICATIONS

This application claims the benefit of U.S. Provisional Patent Application No. 62/778,827, filed Dec. 12, 2018, titled "DENTAL ATTACHMENT PLACEMENT STRUCTURE," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

In particular, U.S. Pat. No. 8,562,337, and U.S. patent application publications no. 2017/0319296, and 2017/0231722 are herein incorporate by reference in their entirety.

FIELD

Described herein are orthodontic appliance attachments, and specifically orthodontic appliance attachment devices that bind to the patient's tooth or teeth and interact with a dental appliance (such as a polymeric shell dental appliance) to direct the force applied to the patient's dentition and/or to provide additional forces on a patient's dentition.

BACKGROUND

Although orthodontic appliances such as orthodontic shell appliances ("aligners") can be effective in moving teeth, complex tooth movements may benefit from the use of attachments on the teeth that engage the appliance to move the tooth. Attachments can be effective to assist in complex tooth movements, particularly if they can be securely adhered to the teeth. In addition, it may be beneficial for attachments to more flexibly engage with the orthodontic appliance. In some cases multiple attachments may be used on the teeth, which may be difficult for the orthodontic practitioner to apply. It would be beneficial in some cases for attachments to engage with the appliance but releasably. Finally, it may also be helpful for attachments to be predictably removable from the teeth. Described herein are a variety of versatile and reliable attachments having one or more modifications that allow an orthodontic appliance such as an orthodontic shell appliance to securely and reliably couple to the teeth and assist in moving the teeth precisely and efficiently.

SUMMARY OF THE DISCLOSURE

The present invention relates to orthodontic attachment devices for interacting with an orthodontic appliance. An orthodontic attachment device (e.g., "attachment" or "attachment device") may include an anchoring attachment body, a bonding surface on the anchoring attachment body that is configured for anchoring the anchoring attachment body to a tooth, and an orthodontic appliance engagement surface on the anchoring attachment body that is configured to contact the orthodontic appliance and apply a locking force between the anchoring attachment body and the orthodontic appliance when the orthodontic appliance engages the orthodontic appliance engagement surface.

The orthodontic attachment devices described herein may include one or more features adapted to improve the bonding to the teeth, improve the appearance of the orthodontic attachment device, improve the transfer of force from the orthodontic appliance to the tooth/teeth, improve the connection between the orthodontic attachment device and the orthodontic appliance, improve the ease and ability of removal of the appliance from the teeth, reduce the weight of the orthodontic attachment device, increase the stability of the connection of the orthodontic attachment device on the tooth, and/or reduce the number of steps for applying the orthodontic attachment device to the patient's teeth. Any of the features described and illustrated herein may be incorporated individually or in any combination with any of the other features described herein.

For example, any of the orthodontic attachment devices described herein may be formed of a material that is translucent and/or matched to the patient's tooth color. The orthodontic attachment device may be configured to permit the passage of light within a wavelength range that is useful for crosslinking or otherwise activating a photosensitive or photcurable epoxy/cement. In some variations the orthodontic attachment device may include one or more light guides (e.g., light pipes, waveguides, etc., including a channel formed of an optically transmissive material). In any of the variations described herein the orthodontic attachment device may include a bonding surface that is configured to diffuse light, and particularly light at the wavelength useful for crosslinking or otherwise activating the epoxy/cement.

The orthodontic attachment devices described herein may be configured to have a spring effect. Any of the orthodontic attachment devices described herein may be formed of two or more material having different material properties, and in particular, may be arranged so the orthodontic attachment device is elastically compressible in one direction (e.g., between the base and the orthodontic appliance engagement surface). In general, the orthodontic attachment device may include an arrangement of regions having different elastic properties (e.g., the body of the orthodontic attachment device may be formed of regions of more or less elasticity). For example, the orthodontic attachment device may include a frame, scaffold, skeleton, etc. within the body of the orthodontic attachment device that has a different material properties, including elasticity, compared to the surrounding material forming the body of the orthodontic attachment device. In some variations the frame is less elastic than the surrounding region. Any of the orthodontic attachment devices described herein may include a hinge region (e.g., in a frame on/in the orthodontic attachment device) that may allow the orthodontic attachment device to be controllably compressed in one direction more than in other directions. An orthodontic attachment device that is more elastically deformable in one or more directions compared to other directions (e.g., compressible between the base and the orthodontic appliance engagement surface) such as those described herein may transfer force from the orthodontic device in an efficient manner.

An orthodontic attachment device may include a detachment region, such as a frangible region, to aid in removing the orthodontic attachment device from the patient's teeth. For example, in some variations, the orthodontic attachment device may include region made from a breakable (frangible) material to aid in removal of the device. In some variations, the orthodontic attachment device may include a perforated region, comprising a plurality of voids or gaps.

In general, any of the orthodontic attachment devices described herein may include one or more voids or gaps within the body of the orthodontic attachment device. The voids or gaps may be configured to reduce the weight of the orthodontic attachment device without significantly impacting the strength of the orthodontic attachment device. In some variations an internal void or gap may be configured to permit compression of the orthodontic attachment device in a desirable manner.

The orthodontic attachment devices described herein may include a bonding surface that is adapted for more securely attaching to the patient's teeth. For example a bonding surface may include three or more projections that allow the orthodontic attachment device to adapt to a variety of curvatures and orientations of a variety of different teeth and/or patients. In general, the orthodontic attachment device may include a bonding surface that is configured to conform to the patient's teeth. Any of the bonding surfaces described herein may be configured to provide a gap or space between the patient's teeth and the orthodontic attachment device, to permit a predefined amount of bonding material (e.g., cement, epoxy, etc.) to be used to secure the orthodontic attachment device to the patient's teeth. In some variations, the orthodontic attachment device is configured to form one or more channels or chambers on the bonding surface to hold the bonding material. As mentioned above, any of the orthodontic attachment devices described herein may include a light guide and/or diffuser to help activate a light-activating bonding agent.

Any of the orthodontic attachment devices described herein may include two or more orthodontic appliance engagement surfaces (one or more bodies projecting from a base, e.g., a bonding surface). For example, a single orthodontic attachment device may be configured as two or more orthodontic attachments that are joined by a shared bonding surface (base) that can be affixed to the patient's teeth as a single unit. More than two (e.g., three, four, etc.) regions that couple with the orthodontic appliance (e.g., multiple orthodontic appliance engagement surfaces) may be included.

Any of these apparatuses may include one or more lip or undercut regions for engaging with the orthodontic appliance. An orthodontic appliance engagement region may include an undercut region relative to the bonding surface forming a lip or hook and configured to engage with the orthodontic appliance. For example, an orthodontic appliance may include an undercut region between the orthodontic appliance engagement surface and the base (e.g., the bonding surface).

As mentioned, any of these orthodontic attachment devices may include a supplemental orthodontic appliance engagement region on the anchoring attachment body, configured to engage a supplemental orthodontic appliance. For example, any of the orthodontic attachment devices described herein may also or alternatively include one or more protrusions or channels for connecting to a second (e.g., "supplemental") orthodontic device, such as an elastic, wire, or the like; the one or more protrusions may be a hook, button, channel, etc. and may be positioned on a portion of the orthodontic attachment device that protrudes through the orthodontic appliance (e.g., aligner) or may be configured so that the supplemental orthodontic appliance (e.g., elastic band, wire, etc.) may be coupled to the supplemental protrusion or channel under the orthodontic appliance.

Any of the orthodontic attachment devices described herein may be fabricated by milling (e.g., from a blank) and/or by 3D printing.

For example, described herein are orthodontic attachment device for interacting with an orthodontic appliance, the device comprising: an anchoring attachment body comprising a first material having a first elastic modulus, and a second material having a second elastic modulus, wherein the second material is more elastic than the first material; a bonding surface on the anchoring attachment body, said bonding surface configured for anchoring the anchoring attachment body to a tooth; and an orthodontic appliance engagement surface on the anchoring attachment body, the orthodontic appliance engagement surface configured to contact the orthodontic appliance and apply a locking force between the anchoring attachment body and the orthodontic appliance when the orthodontic appliance engages the orthodontic appliance engagement surface; wherein the first elastic material extends from the bonding surface to the orthodontic appliance engagement surface, further wherein the second material is at least partially between the first material and the second material.

An orthodontic attachment device for interacting with an orthodontic appliance may include: an anchoring attachment body comprising a frame formed of first material having a first elastic modulus; a bonding surface on the anchoring attachment body, said bonding surface configured for anchoring the anchoring attachment body to a tooth; and an orthodontic appliance engagement surface on the anchoring attachment body, the orthodontic appliance engagement surface configured to contact the orthodontic appliance and apply a locking force between the anchoring attachment body and the orthodontic appliance when the orthodontic appliance engages the orthodontic appliance engagement surface; wherein the frame extends from the bonding surface to the orthodontic appliance engagement surface; further wherein the frame is elastically compressible.

In some variations, an orthodontic attachment device for interacting with an orthodontic appliance includes: an anchoring attachment body, wherein the anchoring attachment body comprises a material that is transparent to a wavelength of light that cross-links a bonding agent; a bonding surface on the anchoring attachment body, said bonding surface configured for anchoring the anchoring attachment body to a tooth, wherein the bonding surface is further configured as an optical diffuser to diffuse a wavelength of light that cross-links a bonding agent on the bonding surface of the device; and an orthodontic appliance engagement surface on the anchoring attachment body, the orthodontic appliance engagement surface configured to contact the orthodontic appliance and apply a locking force between the anchoring attachment body and the orthodontic appliance when the orthodontic appliance engages the orthodontic appliance engagement surface.

An orthodontic attachment device for interacting with an orthodontic appliance may include: an anchoring attachment body; a bonding surface on the anchoring attachment body, said bonding surface configured for anchoring the anchoring attachment body to a tooth, wherein the bonding surface comprises a plurality of protrusions extending therefrom; and an orthodontic appliance engagement surface on the anchoring attachment body, the orthodontic appliance engagement surface configured to contact the orthodontic appliance and apply a locking force between the anchoring attachment body and the orthodontic appliance when the orthodontic appliance engages the orthodontic appliance engagement surface.

In some variations, an orthodontic attachment device for interacting with an orthodontic appliance includes: a first anchoring attachment body region; a second anchoring attachment body region; a bonding surface on the first and second anchoring attachment body regions and extending between the first and second anchoring attachment body regions, said bonding surface configured for anchoring the anchoring attachment body to a tooth; and a first orthodontic appliance engagement surface on the first anchoring attachment body region, the first orthodontic appliance engagement surface configured to contact the orthodontic appliance and apply a first locking force between the first anchoring attachment body region and the orthodontic appliance when the orthodontic appliance engages the first orthodontic appliance engagement surface; and a second orthodontic appliance engagement surface on the second anchoring attachment body region, the second orthodontic appliance engagement surface configured to contact the orthodontic appliance and apply a second locking force between the second anchoring attachment body and the orthodontic appliance when the orthodontic appliance engages the second orthodontic appliance engagement surface.

For example, a when the orthodontic attachment device includes a first material having a first elastic modulus, and a second material having a second elastic modulus, the second material may be layered between the first material. In some variations, the first material is arranged as a frame extending between the bonding surface and the orthodontic appliance engagement surface. The frame may be configured as a spring (e.g., coil spring, leaf spring, etc.).

As mentioned, any of these orthodontic attachment devices may include one or more voids within the second material.

The anchoring attachment body may comprise a material that is transparent to a wavelength of light that cross-links a bonding agent. In some variations, the orthodontic attachment device includes an optical channel extending through the anchoring attachment body to transmit a wavelength of light that cross-links a bonding agent on the bonding surface of the device.

In any of the orthodontic attachment devices described herein, the entire orthodontic attachment device (or just one or more portion, such as the anchoring attachment body) may include a material configured to match the translucency/transparency and/or color of the patient's teeth.

As mentioned, the bonding surface may be configured as an optical diffuser to diffuse a wavelength of light that cross-links a bonding agent on the bonding surface of the device. The diffuser may generally spread out (more evenly diffuse) light passing through the bonding surface, and may be configured as a holographic diffuser, opalescent diffuser, etc. The diffuser may be a diffractive diffuser and/or homogenizer. In some variations, the bonding surface may be treated (e.g., to roughen, or otherwise pattern it) to more readily diffuse light. The material forming the bonding surface may be selected to enhance the optical diffusivity.

The bonding surface may generally comprise a plurality of protrusions extending therefrom (e.g., 3 or more protrusions). The protrusions may be rounded (e.g., having a rounded base, for readily contacting a variety of tooth surface shapes. The protrusion may be arranged as lines or grids.

Any of the orthodontic attachment devices described herein may include a frangible removal region extending at least partially through the anchoring attachment body and configured to separate at least a portion of the anchoring attachment body from the bonding surface to remove the at least a portion of the anchoring attachment body from the bonding surface.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 1A and 1B show examples of a top perspective view and a bottom perspective view, respectively of an orthodontic attachment device.

FIG. 1C is an example of an orthodontic attachment device bonded to a tooth.

FIG. 1D illustrates an example of an orthodontic device (shown in FIG. 1D as an aligner) being attached to a patient's dental arch in which one or more teeth of the patient's dental arch includes an orthodontic attachment device.

FIG. 2A is an example of an orthodontic attachment device.

FIG. 2B is an example of a section through an orthodontic attachment device.

FIG. 2C is an example of an orthodontic attachment device.

FIG. 2D is an example of an orthodontic attachment device.

FIG. 2E is an example of an orthodontic attachment device.

FIG. 2F shows a patient's tooth including two orthodontic attachment devices bonded thereto.

DETAILED DESCRIPTION

Figure 3A:
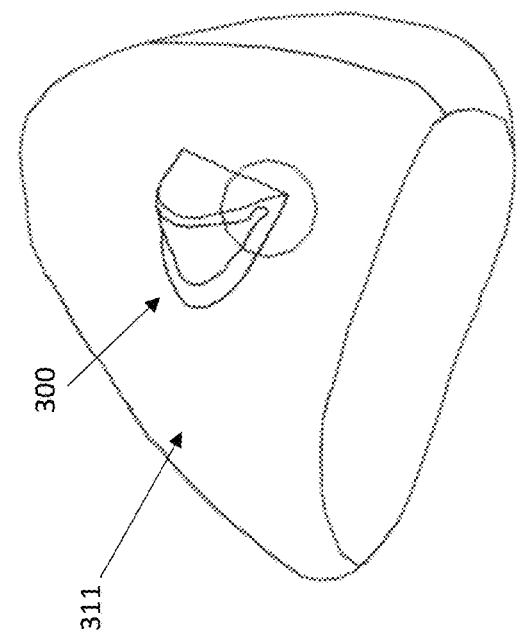
FIG. 3A is an example of an orthodontic attachment device.

In general, described herein are orthodontic attachment devices for interacting with an orthodontic appliance, as well as systems including any of these orthodontic attachment devices, methods of forming the orthodontic attachment devices, and/or methods of using the orthodontic attachment devices to adjust a patient's dentition. An orthodontic attachment devices may also be referred to as an orthodontic attachment or simply an attachment.

Any of the orthodontic attachment devices may include an anchoring attachment body, a bonding surface on the anchoring attachment body, said bonding surface configured for anchoring the anchoring attachment body to a tooth; and an orthodontic appliance engagement surface on the anchoring attachment body. The orthodontic appliance engagement surface may be configured to contact the orthodontic appliance and apply a locking force between the anchoring attachment body and the orthodontic appliance when the orthodontic appliance engages the orthodontic appliance engagement surface.

In general, the attachment body may be any appropriate shape, and may extend between about 0.5 mm and 8 mm from the bonding surface. The attachment body may include one or more upper surfaces that extend from the patient's tooth when the orthodontic attachment device is bonded to the patient's teeth. The upper surfaces may be smooth or rounded, as will be described in greater detail herein. The bonding surface may be a bottom surface that faces the patient's tooth and may bond to the patient's tooth directly or via an added bonding agent. The bonding surface may be configured for securing the anchoring attachment body to the patient's dentition (e.g., the patient's tooth). A bonding agent, such as an adhesive or cement, including a biocompatible adhesive, may be used to adhere the bonding surface to the patient's dentition. For example, a bonding surface may be configured such that an adhesive can be placed on bonding surface for purposes of fixedly attaching anchoring attachment body to the patient's tooth or teeth.

The orthodontic appliance engagement surface may be configured to engage, including reliably engage, an orthodontic appliance such as an aligner, so that force may be applied between the tooth and the orthodontic appliance through the orthodontic attachment device. As will be described in greater detail below, the orthodontic attachment device may direct and influence the force applied by the orthodontic appliance to the teeth.

FIGS. 1A-1D illustrate one example of an orthodontic attachment device for interacting with an orthodontic appliance. FIG. 1A shows a top perspective view of the exemplary orthodontic attachment device 101, while FIG. 1B shows a bottom perspective view. In FIG. 1A, the orthodontic attachment device includes an anchoring attachment body 103, and an orthodontic appliance engaging surface 107 on the anchoring attachment body. The orthodontic appliance engagement surface is configured to contact the orthodontic appliance. The orthodontic attachment device may also include a bonding surface 105 on the bottom/back of the anchoring attachment body, as shown in FIG. 1B. The bonding surface is configured to be bonded to the patient's tooth (or teeth), as shown in FIG. 1C. FIG. 1C illustrates the attachment of the exemplary orthodontic attachment device such as shown in FIGS. 1A-1B onto one of the patient's teeth 111. Adjacent teeth 113 may also include one or more attachments or may not include any attachments. The orthodontic appliance may be bonded to the patient's tooth 111 in a predefined orientation so that the attachment couples with an aligner 100 that is applied onto the teeth 102 (and over the orthodontic attachment device 101), as illustrated in FIG. 1D. The orthodontic appliance (e.g., aligner 100) may include a mating region 106, such as a cavity, pocket, projection, etc. for mating with the orthodontic attachment device, including in particular the orthodontic appliance engagement surface. The orthodontic appliance engagement surface on the anchoring attachment body may apply a locking force between the anchoring attachment body and the orthodontic appliance when the orthodontic appliance engages the orthodontic appliance engagement surface.

Typically, the orthodontic attachment device is rigidly attached (bonded) to the patients' teeth, e.g., via a cement, adhesive, etc. Although the orthodontic attachment device may itself be formed of a uniform material, and/or be rigid and/or solid, in some variations, it may be beneficial to have the anchoring attachment body be configured to apply a spring force. For example, the anchoring attachment body may have different regions having different material properties; these regions may be arranged to provide mechanical strength while engaging with the orthodontic appliance, yet be lighter than a fully solid or uniform anchoring attachment body. In some variations, the anchoring attachment body may be formed of a first material having a first elasticity, e.g., as determined by the bulk modulus (K) or Young's modulus (E) of the material, and a second material having a greater (e.g., by more than 5%, 10%, 15%, 20%, 25%, etc.) elasticity, e.g., bulk modulus or Young's modulus. The less elastic material may be formed into a frame that extends from the bonding surface (or adjacent to the bonding surface) and the orthodontic appliance engagement surface, while the more elastic material may extend around the frame and may form the rest of the anchoring attachment body.

For example, FIG. 2A illustrates a first example of an orthodontic attachment body including a frame 206 that extends from (and in this example, includes) the bonding surface and the orthodontic appliance engagement surface. In FIG. 2A, the orthodontic attachment device also includes a second material 204 forming the bulk of the anchoring attachment body. The second material may be a material that is more elastic than the first material forming the frame. This may allow the frame to compress and expand slightly, while permitting the frame to securely attach to the orthodontic appliance. Filling or surrounding (at least partially surrounding) the frame forming the orthodontic attachment device with the second, more elastic, material may permit the device to flex or compress slightly, without risking breaking or fracture of the orthodontic attachment device.

In some variations the first material may be metallic (e.g., stainless steel, aluminum, titanium, Nitinol, etc.) or polymeric (e.g., polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof), or the like.

The frame may generally extend from the base (e.g., bonding surface) of the attachment device to the orthodontic appliance engagement surface. In some variation either or both the orthodontic appliance engagement surface and the bonding surface may be formed of the frame. Alternatively, the frame may be coupled to the orthodontic appliance engagement surface and/or the bonding surface. In some variations the frame extends to only a portion of the orthodontic appliance engagement surface and/or the bonding surface. The frame may include one or more wires, struts, beams, and/or one or more sheets, layers, leaf, plate, etc. In general, the frame may refer to any internal support structure. The frame may be configured as a spring (e.g., coil spring, leaf spring, etc.). For example, force applied to the frame may compress, including elastically compress, the orthodontic attachment device. The ability to compress the orthodontic attachment device slightly in one or more directions (e.g., to lower the profile relative to the tooth surface when applying the aligner to the teeth) may aid in attachment, while securing the attachment of the aligner to the patient's teeth.

In some variations the anchoring attachment body may include one or more voids. The voids may be filled with (or exposed to) air. The void(s) may reduce the weight of the apparatus. For example, FIG. 2B, shows an exemplary cross-section through an attachment 200 such as the one shown in FIG. 2A. In FIG. 2B, the orthodontic attachment device includes a void 220 within the anchoring attachment body, in this example, within the second material 204 between the frame 206. The frame in this example may also act as a spring, allowing compression in the direction normal to (or approximately normal to) the orthodontic appliance engagement surface 207. The open V-shape of the frame (in FIG. 2B), filled with the more elastic and/or more compressible second material 204 may permit flexing and bending, particularly in variations having one or more voids in the secondary material, as shown. In some variations the voids may be filled with a gaseous material (e.g., air); alternatively in some variations the voids may be filled with a less compressible material, such as a fluid or a third solid (e.g., polymeric) material. In some variations, as shown in FIG. 2C, the anchoring attachment may include only the frame, and all or most of the second material may be left out.

In some variations, the orthodontic attachment has two or more layers of material(s) having different elastic properties. For example, FIG. 2D illustrates an example of an orthodontic attachment in which the anchoring attachment body includes three layers: a first layer or a first material 218, which has first material properties, including a first modulus of elasticity, a second layer of material 219, which has second material properties, including a second modulus of elasticity, and a third layer of material 218', which may have third material properties, and a third modulus of elasticity. In some variations the first and third layers may be the same material, or a different material. The second layer may have a greater elasticity than the first layer.

Similarly in some variations the frame may be made of more than one material, including more than one regions or layers of material, having different material properties, including different elasticities. FIG. 2E shows an example of an orthodontic attachment device including multiple regions with different material properties. In FIG. 2E, the frame 226 is formed of a first material but includes a region having a second modulus of elasticity 214 (and is more elastic) compare the other region of the frame. FIG. 2F illustrates an example of a tooth 211 with a pair of distinct orthodontic attachment devices 200, 200' bonded on the tooth. In this example, the first orthodontic attachment device 200 is similar to the one shown in FIG. 2E.

In general, although the orthodontic attachment devices shown are primarily rounded, hemi-ovals shapes (with a flattened or cut side forming the orthodontic appliance engagement surface), any appropriate shape may be used. For example, the orthodontic attachment device (e.g., the anchoring attachment body) may have a more rectangular shape, a hemispherical shape, a pyramidal shape, an irregular shape, etc.

Figure 3B:
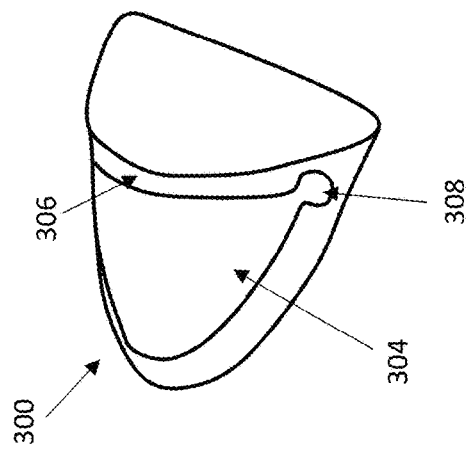
FIG. 3B illustrates the orthodontic attachment device of FIG. 3A bonded to a tooth.

As mentioned, any of the orthodontic attachment devices described herein may be configured to be compressible in a spring-like manner. In some variations, the orthodontic attachment device may include a frame (e.g., the anchoring attachment body may include a frame) that includes a hinge region. For example, FIG. 3A the orthodontic attachment device 300 includes a frame 306 that is configured to provide a spring effect. In FIG. 3A, the frame includes a hinge region 308 formed by a cut-out region at the intersection of the connection between the bonding surface portion of the frame and the orthodontic appliance engagement surface portion of the frame. Force applied (e.g., against the orthodontic engagement surface and/or the top surface of the orthodontic attachment device) may cause the frame and therefore the orthodontic attachment device to elastically compress towards the bonding surface. In some variations the anchoring attachment body may also include a second material 304, as described above, at least partially between the frame and having a greater elasticity than the frame. FIG. 3B illustrates the orthodontic attachment device of FIG. 3A bonded to a tooth 311.

Compressing the orthodontic attachment device when force is applied by attaching and/or sustaining the attachment to an orthodontic appliance (not shown) may transfer force between the orthodontic appliance (e.g., aligner) and the tooth/teeth in a desired manner. Further, compression of the attachment in the direction approximately normal to the orthodontic appliance attachment surface may also make it easier to attach the orthodontic appliance to the patient's dentition without reducing the retention of the orthodontic appliance on the teeth.

Bonding of Orthodontic Attachment Device to Teeth

Any of the orthodontic attachment device descried herein may be bonded to the dentition (e.g., the patient's tooth or teeth) at the bonding surface(s) of the orthodontic attachment device. For example the device may be bonded by applying a cement, epoxy, or any other bonding agent to the bonding surface to attach the orthodontic attachment device to the patient's teeth. Attachment may be made in any suitable manner. For example, the orthodontic attachment device may secured via an epoxy that can be cured to the tooth surface, for instance, by use of a light source, such as blue light, infrared/near-infrared, and/or ultra-violet (UV) light source, which will bond the attachment material directly to the surface of the tooth. In some embodiments, an adhesive material can be applied to the back side (the bonding surface) of the orthodontic attachment body, and the adhesive can be used to secure the attachment to the tooth surface. The adhesive may be any appropriate material, such as an attachment composite material. For example, a UV-curable resin such as acrylic resins (which may include the use of a primer) may be used.

In some variations the orthodontic attachment device may be configured to transmit the cross-linking wavelength(s) of light. For example, in some variations all or some of the anchoring attachment body and/or the bonding surface is formed of a material that is optically transparent (e.g., passes >30%, >40%, >50%, >60%, >70%, etc.) of the optical wavelength that crosslinks the bonding agent. In some variations, the orthodontic attachment device includes a light guide configured to pass the wavelength(s) used for cross-linking the bonding agent. The light guide(s) may extend from a top region of the attachment device to the bonding surface. The wavelength may be, for example infrared light/near-infrared light, blue light, e.g., 450-490 nm, or other visible light range. Thus, all or a portion of the orthodontic attachment device may transmit the appropriate wavelength, permitting uniform cross-linking of the attachment to the tooth.

Figure 4A:
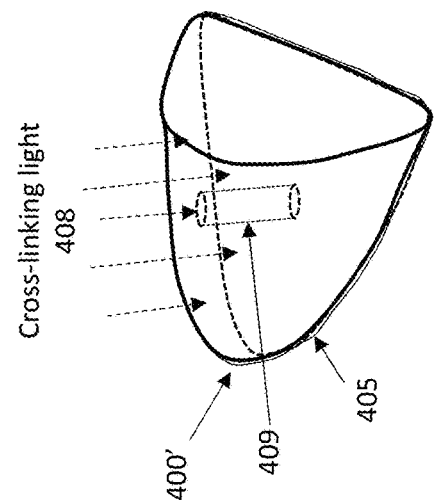
FIG. 4A is an example of an orthodontic attachment device.

For example, FIG. 4A illustrates a first variation of an orthodontic attachment device, that is configured to transmit the cross-linking wavelength through the attachment to enhance bonding of the orthodontic attachment device to the patient's teeth using a light-activated bonding agent. In FIG. 4A, the attachment device 400 includes a body and bottom bonding surface that is transparent to the optical wavelength used to activate the photosensitive bonding agent. Thus, when activating light 408 is shined on the attachment device, the bonding agent 405 between the tooth and the bonding surface may be fully activated.

Figure 4B:
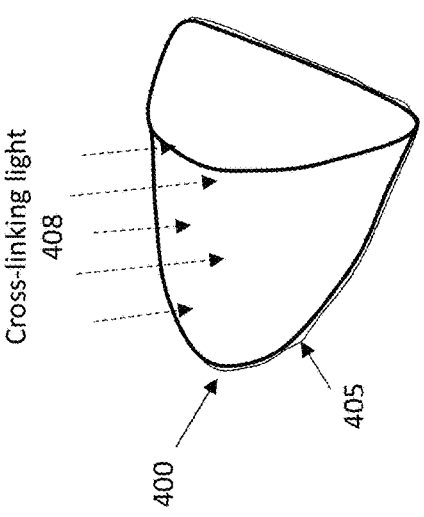
FIG. 4B is an example of an orthodontic attachment device.

FIG. 4B illustrates an example in which the orthodontic attachment device includes one or more light channels (e.g., waveguides) for transmission of the optical wavelength that activates the bonding agent. In FIG. 4B, a channel 409 extending from the top of the attachment 400' to the bonding surface (bottom) of the device may transmit light to activate bonding of the bonding agent 405. In some variations the bonding surface may be configured to scatter the light, distributing it along the bottom bonding surface. For example, the bonding surface may be configured as a diffuser to diffuse the light, by including a diffusing material, and/or a surface feature (e.g., ridges, irregularities, etc.) to diffuse the light.

In general, the bonding surface may be configured to conform the surface of the tooth onto which it is to be attached. As described in U.S. 2017/0319296, previously incorporate by reference in its entirety, one or more attachment placement structures may be used to place or position the attachment on the patient's teeth.

In any of the orthodontic attachment devices described herein, the device may be configured to match or substantially match the appearance of the tooth onto which it is attached. Thus, any of these devices may be formed of a translucent material that is configured to match the translucency/transparency and/or color of the patient's teeth. The translucency/transparency and/or color of the patient's teeth may be determined by detecting the optical properties of the patient's specific tooth or teeth (or based on a general/generic matching to human teeth or within a matched range). The visual properties of a patient's tooth may vary based on the lighting of the tooth, including color and transparency, which may be a function of both external and internal features. When creating the orthodontic attachment device, it is highly desirable to make the attachment so that it has a realistic, and preferably customized, color and transparency that matches or is consistent with the patient's existing teeth. For example, the patient's teeth may be scanned with an optical scanner to determine the optical properties (including the translucency/transparency and/or color of the patient's teeth), and the resulting model, which may be a volumetric model of the patient's teeth, may be matched to these parameters. Although a variety of optical properties may be used to determine translucency/transparency and/or color, it may be particularly helpful to include one or more of: light absorption, light reflection, light transmission, and light scattering. Additional or alternative optical properties that may be used include: hue, transparency, translucency, opalescence, chroma, value, luster and florescence. These optical properties may be specific to one or more light wavelengths (e.g., visible light wavelengths, such as red, green and/or blue wavelengths or groups of wavelengths).

Figure 5C:
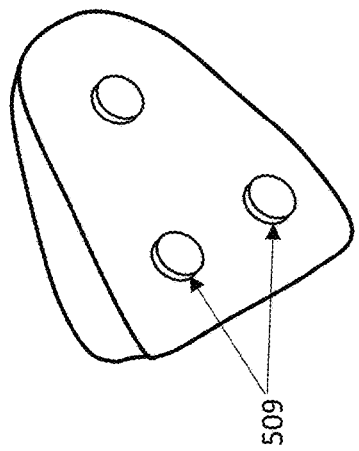
FIG. 5C is an example of a bottom (bonding surface) of an orthodontic attachment device including three protrusions extending therefrom.

Any of the orthodontic attachment devices described herein may be configured to more uniformly distribute the bonding agent over between the device and the patient's tooth. Thus, any of the orthodontic attachment devices described herein may include one or more channels and/or projections forming the bonding surface. In some variations three or more (e.g., three, four, etc.) projections may be included for forming contact with the surface of the patient's tooth and allowing room for sufficient bonding agent to fit between the orthodontic attachment device and the tooth. For example, FIG. 5A illustrates an example of a pair of orthodontic attachment devices 500 (similar to those shown in FIG. 2A-2B) bonded, via a bonding agent, such as a light activated bonding agent, to a patient's tooth. In general, the bonding surface may be configured to contact to the patient's tooth while leaving sufficient clearance for the bonding agent. For example FIGS. 5B and 5C illustrate an example of an orthodontic attachment device having a bonding surface with three protrusions 509 extending from the device that may make contact with a variety of tooth shapes while leaving spacing between the bonding surface and the tooth for a bonding agent (e.g., cement, epoxy, etc.). In particular, in variations in which the bonding surface is configured as a diffuser and/or the orthodontic attachment device is configured to transmit the light wavelength(s) that activate the bonding agent, a relatively thick layer of bonding agent may be used, determined in part by the height of the protrusions 509.

Figure 5F:
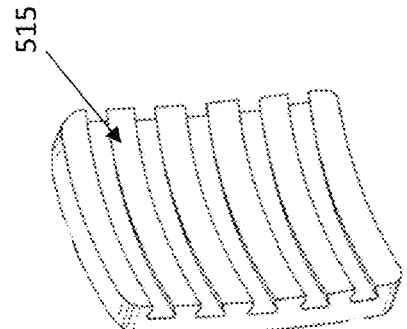
FIG. 5F is an example of an orthodontic attachment device including a lined pattern formed on/from the bonding surface.
Figure 5B:
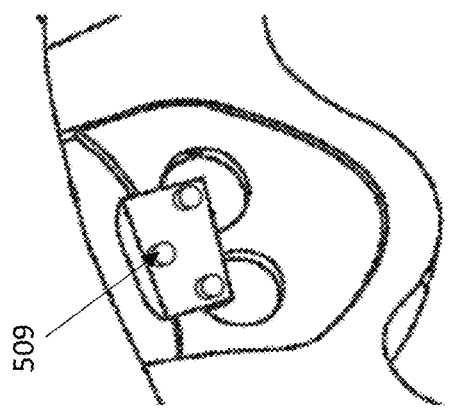
FIG. 5B shows an orthodontic attachment device including three protrusions extending from the bonding surface on the bottom of the orthodontic attachment device.
Figure 5E:
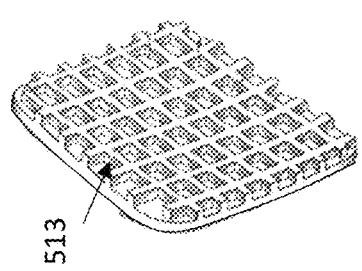
FIG. 5E is an example of an orthodontic attachment device including a grid pattern formed on/from the bonding surface.
Figure 5A:
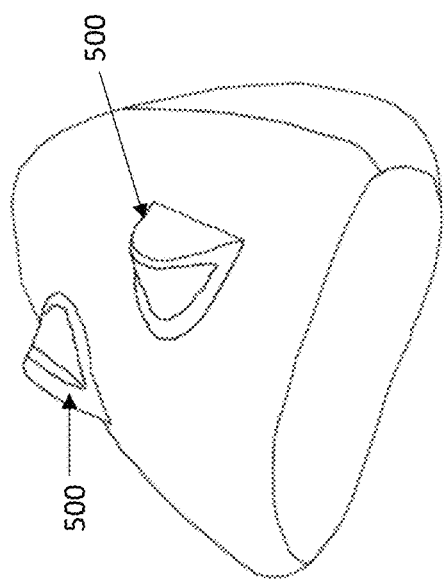
FIG. 5A illustrates a tooth showing two orthodontic attachment devices bonded thereto.
Figure 5D:
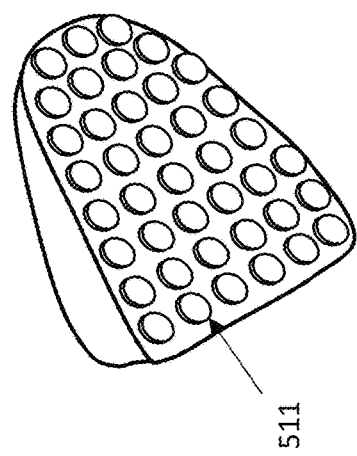
FIG. 5D is an example of an orthodontic attachment device including protrusions extending from the bonding surface.

Although FIGS. 5B and 5C illustrate three protrusions, in some variations, more than three protrusions 511 may be used, as shown in FIG. 5D. Although the protrusions shown are cylindrical, other shapes, including rounded or curved (e.g., slightly outwardly convex) may be used. Alternatively, in some variation the protrusions may have a surface that matches the curvature of the patient's tooth (e.g., FIG. 5F).

FIGS. 5E and 5F illustrate other examples of bonding surfaces that form a plurality of contact regions (e.g., protrusions), resulting in channels and/or openings into which a bonding agent may be located. In FIG. 5E, a grid-like pattern 513 extending from the bottom of the orthodontic attachment device is shown. FIG. 5F shows a plurality of protruding ridges 515 extending from the bonding surface. Combinations of such protrusions may be used. In some variations channels may be formed along the bottom (bonding surface) for the bonding agent. These bonding surfaces may increase the retention of the orthodontic attachment device to the tooth.

Any of the orthodontic attachment devices described herein may also or alternatively be configured to include one or more features to assist in removal of the attachment device. For example, in some variations attachment devices are configured to be worn for one or more phase of a multi-phase treatment plan. The multi-phase treatment plan may include, for example an orthodontic treatment device (e.g., aligner) that is worn for a first treatment period (e.g., 1 week, 2 weeks, 3 weeks, 4 weeks, etc.). In some variations the attachment devices may be worn for the entire treatment, which may span months (e.g., 2 months, 3 months, 4 months, 5 months, 6 months, 7 months, 8 months, 9 months, 10 months, 12 months, 14 months, 16 months, 18 months, 20 months, 24 months, etc.). In some variations the attachment device may be repositions and/or removed between some or each of the treatment steps in a treatment plan. For example, in some variations an attachment device may be positioned on a first tooth during a particular stage of a treatment plan, and the corresponding orthodontic treatment device (e.g., aligner) may apply force through the device to modify the patient's dentition. A subsequent treatment phase may add or remove the earlier-positioned attachment device(s). During the treatment step in which the attachment device is to be used, it is desirable that the attachment device be securely bonded to the patent's tooth; however, it may be particularly beneficial to provide attachment devices that may also be removed easily.

For example, in some variation the orthodontic attachment device may include one or more frangible region(s) to aid in removal of the attachment device from the patient's tooth. A frangible region may provide an engineered point of breakage for the attachment device that may assist in removal of the attachment device. Thus, any of these apparatuses may include a predefined breaking region; the breakage region (e.g., frangible region) may be configured as a region having a lower material strength than the adjacent region. For example, the attachment device may include a two-stage removal feature that is configured to permit the first stage (e.g., a portion of the anchoring attachment body above the bonding surface) to be removed first, which may assist in later removal of the smaller portion (e.g., bonding surface) from the tooth. In some variations, even with the smaller region of the attachment device left on the tooth, the subsequent treatment stage (such as a subsequent aligner that does not include an engagement region for the particular, partially-removed attachment device) may be used without interfering with the treatment.

Figure 6:
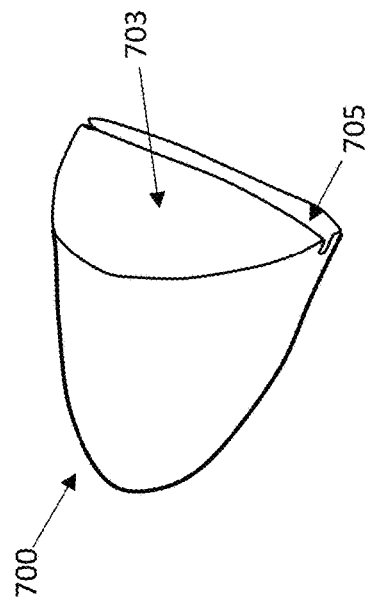
FIG. 6 is an example of an orthodontic attachment device including a frangible region.

In some variations, the frangible region may be arranged parallel or substantially parallel to the bonding surface (e.g. the tooth surface) so that a force applied in this direction may disengage the larger (e.g., anchoring attachment body) from the smaller (e.g., bonding surface). In general, the frangible region may be arranged such that treatment forces applied through the attachment device will be orthogonal to the frangible region. FIG. 6 illustrates and example of an orthodontic attachment device 600 including a removal (e.g., frangible) region 603. The frangible region is configured to break and release the upper portion of the anchoring attachment body when force is applied into the frangible region (e.g., in this example, transverse to the attachment device and tooth surface); the force applied by the aligner to the orthodontic appliance engagement surface 607 is therefore unlikely to result in breaking the frangible removal region. The frangible removal region (shown as a dashed line in FIG. 6) may be formed by, for example, a plurality of voids or including of material having a lower strength in this region.

Figure 7:
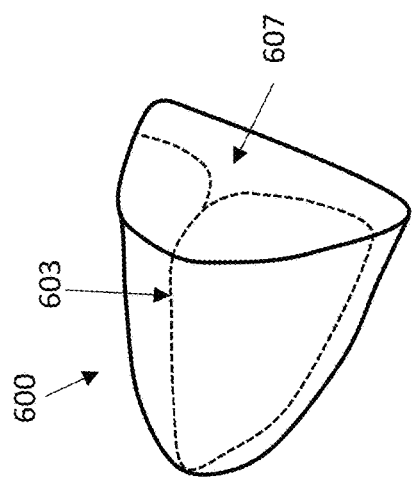
FIG. 7 is an example of an orthodontic attachment device including a lip or undercut region.

Any of the orthodontic attachment devices described herein may include one or more undercut features configured to engage (e.g., hook into) the orthodontic appliance. For example, the anchoring attachment body may include an undercut region forming a lip into which the orthodontic appliance may engage. In particular, the orthodontic appliance engagement region may be undercut relative to the bonding surface. The undercut region may form a lip, ridge, hook or other engagement region that may engage with a complimentary region on the orthodontic appliance. For example, FIG. 7 illustrates one example of an orthodontic attachment device 700 including an undercut region 705 forming a lip in the orthodontic appliance engagement surface 703. In some variations, the lip may be configured as a hook. The undercut region may create a clasping engagement with the orthodontic device.

Any of the apparatuses described herein may also include one or more supplemental orthodontic appliance engagement regions. A supplemental orthodontic appliance engagement region may comprise a button, hook, channel, and/or protrusion configured to engage an additional appliance (in addition to the orthodontic appliance/aligner). An additional (e.g., supplemental) orthodontic appliance may include, for example, an elastic band (e.g., rubber band) that may be used to apply additional force to the teeth. For example, in some variations, the attachment device may be configured to extend through the orthodontic appliance, such as an aligner, when the orthodontic device is worn on the teeth. In this example portion of the attachment device extending through the appliance may include one or more engagement region(s) for engaging with an additional orthodontic device, such as an elastic band. Alternatively, in some variations the supplemental orthodontic appliance engagement region may be configured to be connected to a supplemental orthodontic appliance under the primary orthodontic appliance, e.g., aligner.

Figure 8:
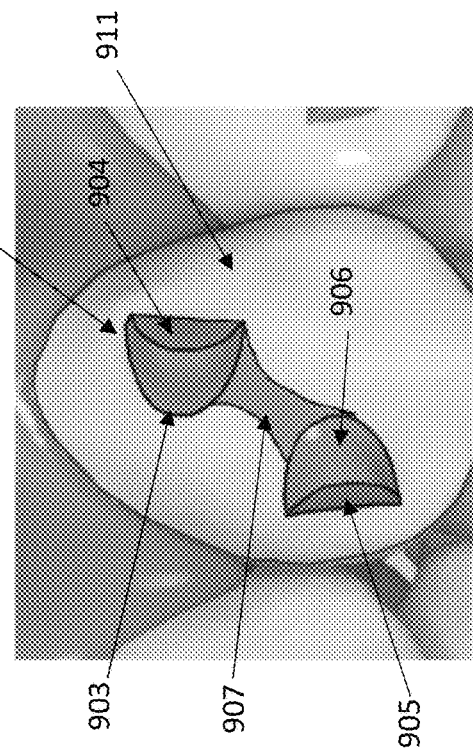
FIG. 8 is an example of an orthodontic attachment device having a supplemental orthodontic appliance engagement region.

FIG. 8 illustrate one example of an orthodontic attachment device 800 including a supplemental orthodontic appliance engagement region 803 that is configured, in this example, as a button onto which a supplemental appliance (e.g., an elastic band) may be attached. As mentioned, the supplemental orthodontic appliance engagement region may be alternatively configured as a hook, a channel, a clasp, etc. The supplemental orthodontic appliance engagement region may be positioned on any portion of the attachment device, including near or at the bonding surface region (as shown in FIG. 8), or near or at the top of the anchoring attachment body.

Any of the orthodontic attachment devices described herein may include more than one orthodontic appliance engagement surfaces. Thus, in some variations, the same orthodontic attachment device may engage with multiple engagement region on the orthodontic appliance. In some variations an attachment device may include a single bonding surface and two or more orthodontic engagement surfaces, each connected to an anchoring attachment body. For example, a first anchoring attachment body may extend from the bonding surface and may have a corresponding first orthodontic appliance engagement surface, and a second anchoring attachment body may extend from the bonding surface and may have a corresponding second orthodontic appliance engagement surface. In some variations the attachment device includes a single anchoring attachment body extending from a bonding surface and includes a first orthodontic appliance engagement surface and a second orthodontic appliance engagement surface. In general, the first and second orthodontic appliance engagement surfaces may be oriented in different directions. In some variations, the orthodontic appliance engagement surfaces may be oriented in the same direction.

The ability to have multiple orthodontic appliance engagement surface on the same attachment device may make it easier and faster to apply the orthodontic attachment device to the patient's teeth, and may also ensure precise spacing and positioning of each orthodontic appliance engagement surface relative to the other, particularly when two or more orthodontic appliance engagement surfaces are positioned on the same tooth.

Figure 9:
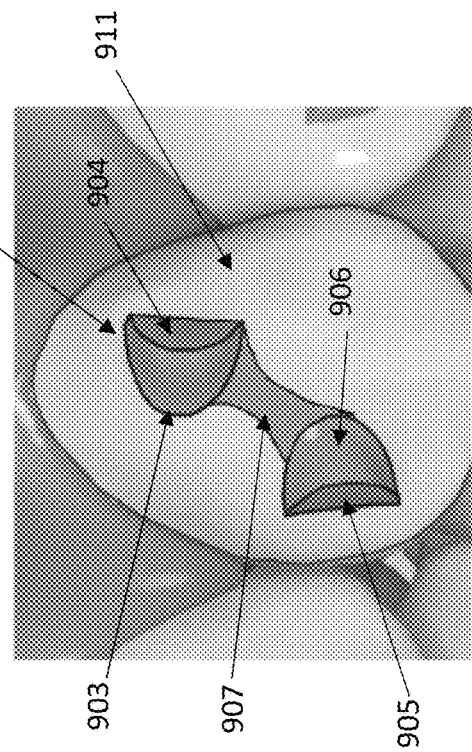
FIG. 9 is an example of an orthodontic attachment device including a pair of separate orthodontic appliance engagement surfaces.

FIG. 9 illustrates one example of an orthodontic attachment device 900 having two separate, and differently oriented orthodontic appliance engagement surfaces. In FIG. 9, the attachment device includes a single bonding surface that underlies a first anchoring attachment body 903 having a first orthodontic appliance engagement surface 904 and a second anchoring attachment body 906 having a second orthodontic appliance engagement surface 905. A connection region 907 extends between the first and second anchoring attachment bodies. The connecting region may be the bonding surface and/or a lower-profile portion of the first and/or second anchoring attachment bodies. Thus, the separate anchoring attachment bodies may be a single anchoring attachment body that include two protruding regions, extending upwards from the bonding surface to form the two separate orthodontic appliance engagement surfaces. In operation, an orthodontic attachment device such as the one shown in FIG. 9 may be bonded to a single tooth 911 to provide multiple attachments for an orthodontic appliance.

In general, any of the features described above separately for FIGS. 1A-9 may be combined in any combination. For example, any of the attachment devices described herein may include regions having multiple material properties, a frame, which may be configured to have a spring-like behavior and/or may be hinged, one or more voids within the anchoring attachment body, may be optically transparent within a predetermined wavelength range (e.g., for cross-linking), such as but not limited to a light channel through the anchoring attachment body, may include a bonding surface configured as a diffuser, may include plurality of protrusions on the bonding surface, may include a frangible breaking region for removal of all or a portion of the attachment device, may include an undercut region for engaging with the orthodontic appliance, may include one or more supplemental orthodontic appliance engagement regions, and/or may include two or more orthodontic appliance engagement surfaces.

Any of these devices may be fabricated by any appropriate manner, including in particular and additive method (e.g., 3D printing) and/or by milling, e.g., milling an attachment from a blank.

The orthodontic attachment devices described herein may be part of an orthodontic system, which may include one or more orthodontic appliances that engage the attachments when worn by a patient. Appliances may have teeth receiving cavities that receive and reposition teeth, e.g., via application of force due to appliance resiliency, such as in the example illustrated in FIG. 1D. The exemplary tooth repositioning appliance or aligner 100 in FIG. 1D can be worn by a patient in order to achieve an incremental repositioning of individual teeth 102 in the jaw. As mentioned, the appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material and/or a digital scan of the patient's teeth, e.g., using an intraoral scanner. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth, with the exception of the anchoring attachment described herein; it may be desirable or necessary to provide attachments for anchoring the aligner on the teeth, and therefore the aligner may have corresponding receptacles or apertures 106 in the appliance so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An orthodontic attachment device for interacting with an orthodontic appliance, the device comprising:
    an anchoring attachment body comprising:
        a first anchoring attachment region and a second anchoring attachment region connected by a connection region;
        a bonding surface on each of the first and second anchoring attachment regions and the connection region, said bonding surfaces configured for anchoring the anchoring attachment body to a tooth; and
        a first orthodontic appliance engagement surface on the first anchoring attachment region, and a second orthodontic appliance engagement surface on the second anchoring attachment region, one or both of the first and second orthodontic appliance engagement surfaces configured to contact the orthodontic appliance and apply a locking force between the anchoring attachment body and the orthodontic appliance when the orthodontic appliance engages the one or both of the first and second orthodontic appliance engagement surfaces, wherein the first and second anchoring attachment regions are oriented differently such that their respective orthodontic appliance engagement surfaces are oriented in different directions,
    wherein the connection region comprises a first coupling end coupled to the first anchoring attachment region and a second coupling end coupled to the second anchoring attachment region, wherein the first coupling end is narrower than the first anchoring attachment region along a plane that is parallel to the bonding surface of the first anchoring attachment region, and wherein the connection region has dimensions that define a first position of the first anchoring attachment region relative to a second position of the second anchoring attachment region, and that further define a first orientation of the first orthodontic appliance engagement surface relative to a second orientation of the second orthodontic appliance engagement surface, so as to maintain set positions and orientations of the first and second anchoring attachment regions relative to each other.

2. The device of claim 1, wherein the anchoring attachment body further comprises one or more voids.

3. The device of claim 2, wherein the one or more voids is filed with air, or exposed to air.

4. The device of claim 2, wherein the one or more voids is filled with a fluid or a solid material.

5. The device of claim 1, wherein the anchoring attachment body comprises a material that is transparent to a wavelength of light that cross-links a bonding agent.

6. The device of claim 1, further comprising an optical channel extending through the anchoring attachment body to transmit a wavelength of light that cross-links a bonding agent on the bonding surfaces of the first and second anchoring attachment regions of the device.

7. The device of claim 1, wherein the anchoring attachment body comprises a material configured to match one or more of: a translucency, a transparency and, a color of the tooth.

8. The device of claim 1, wherein the bonding surfaces of the first and second anchoring attachment regions are configured as optical diffusers to diffuse a wavelength of light that cross-links a bonding agent on the respective bonding surfaces of the first and second anchoring attachment regions of the device.

9. The device of claim 1, wherein the bonding surfaces of the first and second anchoring attachment regions comprise a plurality of protrusions extending therefrom.

10. The device of claim 1, further comprising a frangible removal region extending at least partially through the anchoring attachment body and configured to separate at least a portion of the anchoring attachment body from the bonding surfaces of the first and second anchoring attachment regions to remove the at least a portion of the anchoring attachment body from the bonding surfaces of the first and second anchoring attachment regions.

11. The device of claim 1, wherein the first and second orthodontic appliance engagement surfaces are each flat.

12. The device of claim 1, wherein each of the first and second orthodontic appliance engagement surfaces is at an angle that is non-parallel with respect to the respective bonding surfaces of the first and second anchoring attachment regions.

13. The device of claim 1, wherein the first and second anchoring attachment regions each includes an upper surface configured to extend from the tooth when the respective bonding surfaces of the first and second anchoring attachment regions are anchored to the tooth.

14. The device of claim 13, wherein the upper surface of each of the first and second anchoring attachment regions have a rounded shape.

15. The device of claim 1, wherein the connection region has a lower profile than the first and second anchoring attachment regions when the anchoring attachment body is bonded to the tooth.

16. The device of claim 1, wherein one or both of the first and second anchoring attachment regions comprises a supplemental orthodontic appliance engagement region that is configured to be attached to a supplemental appliance.

17. The device of claim 16, wherein the supplemental appliance is an elastic band.

18. The device of claim 16, wherein the supplemental orthodontic appliance engagement region is a button, hook, channel, or clasp.

19. The device of claim 1, wherein
the first anchoring attachment region comprises a first undercut that forms a first lip between the first orthodontic appliance engagement surface and the bonding surface of the first anchoring attachment region, wherein the first undercut is arranged to create a clasping engagement with the orthodontic appliance; and/or
the second anchoring attachment region comprises a second undercut that forms a second lip between the second orthodontic appliance engagement surface and the bonding surface of the first anchoring attachment region, wherein the second undercut is arranged to create a clasping engagement with the orthodontic appliance.

20. The device of claim 1, wherein each of the first and second anchoring attachment regions has a rounded, hemi-oval shape, and wherein the first and second orthodontic appliance engagement surfaces correspond to flattened sides on their respective first and second anchoring attachment regions.

21. The device of claim 1, wherein the first and second anchoring attachment regions are solely connected to each other by the connection region.

22. The device of claim 1, wherein the second coupling end is narrower than the second anchoring attachment region along a plane that is parallel to the bonding surface of the second anchoring attachment region.

23. An orthodontic attachment device for interacting with an aligner, the device comprising:
an attachment body comprising:
a first anchoring attachment region having a first aligner engagement surface;
a second anchoring attachment region having a second aligner engagement surface;
wherein one or both of the first and second aligner engagement surfaces is configured to contact the aligner and apply a locking force between the attachment body and the aligner when the aligner engages with one or both of the first and second aligner engagement surfaces, wherein the first and second anchoring attachment regions are oriented differently such that their respective aligner engagement surfaces are oriented in different directions;
a connection region extending between and connecting the first and second anchoring attachment regions; and
a bonding surface on each of the first and second anchoring attachment regions and the connection region, the bonding surfaces configured for anchoring the attachment body to a tooth,
wherein the connection region comprises a first coupling end coupled to the first anchoring attachment region and a second coupling end coupled to the second anchoring attachment region, wherein the first coupling end is narrower than the first anchoring attachment region along a plane that is parallel to the bonding surface of the first anchoring attachment region, and wherein the connection region has dimensions that define a first position of the first anchoring attachment region relative to a second position of the second anchoring attachment region, and that further define a first orientation of the first aligner engagement surface relative to a second orientation of the second aligner engagement surface, so as to maintain set positions and orientations of the first and second anchoring attachment regions relative to each other.

24. The device of claim 23, wherein the first and second aligner engagement surfaces are in different orientations with respect to the respective bonding surfaces of the first and second anchoring attachment regions.

25. The device of claim 23, wherein the attachment body is configured to match one or more of: a translucency, a transparency and, a color of the tooth.

* * * * *